United States Patent [19]

Smith et al.

[11] Patent Number: 5,492,188
[45] Date of Patent: Feb. 20, 1996

[54] STRESS-REDUCED SUPERHARD CUTTING ELEMENT

[75] Inventors: Redd H. Smith, Salt Lake City; Arthur A. Chaves, Sandy, both of Utah

[73] Assignee: Baker Hughes Incorporated, Houston, Tex.

[21] Appl. No.: 261,713

[22] Filed: Jun. 17, 1994

[51] Int. Cl.$^6$ .................................................. E21B 10/46
[52] U.S. Cl. ........................... 175/432; 175/433; 175/434; 76/108.2
[58] Field of Search ..................................... 175/434, 433, 175/432, 431, 428, 420.2; 76/108.2, DIG. 11, DIG. 12

[56] References Cited

U.S. PATENT DOCUMENTS

| | | | |
|---|---|---|---|
| 4,702,649 | 10/1987 | Komanduri | 175/433 X |
| 4,919,220 | 4/1990 | Fuller et al. | 175/433 |
| 5,007,207 | 4/1991 | Phaal | 51/204 |
| 5,103,948 | 3/1993 | Noggle | 407/116 |
| 5,120,327 | 6/1992 | Dennis | 51/293 |
| 5,135,061 | 8/1992 | Newton, Jr. | 175/428 |
| 5,159,857 | 11/1992 | Jurewicz | 76/108.2 |
| 5,217,081 | 6/1993 | Waldenstrom et al. | 175/420.2 |
| 5,244,712 | 9/1993 | Eden | 428/142 |
| 5,355,969 | 10/1994 | Hardy et al. | 175/432 |

FOREIGN PATENT DOCUMENTS

| | | |
|---|---|---|
| 582484A1 | 2/1994 | European Pat. Off. . |
| 604211A1 | 6/1994 | European Pat. Off. . |
| 2261894A | 6/1993 | United Kingdom . |
| 2279677A | 1/1995 | United Kingdom . |

*Primary Examiner*—Stephen J. Novosad
*Attorney, Agent, or Firm*—Trask, Britt & Rossa

[57] ABSTRACT

A cutting element suitable for incorporation in a drill bit used for earth drilling is disclosed which comprises an abrasive layer of superhard material formed on a substrate support, the substrate and/or the abrasive layer being structurally modified to reduce and/or redistribute detrimental tensile stresses which occur at the periphery of the abrasive layer and at or near the interface between the abrasive layer and the substrate, and within the body of the substrate. The modified cutting element structure reduces the occurrence of fracturing and cutter degradation.

39 Claims, 5 Drawing Sheets

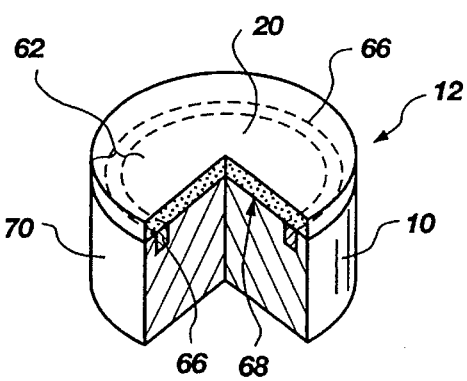
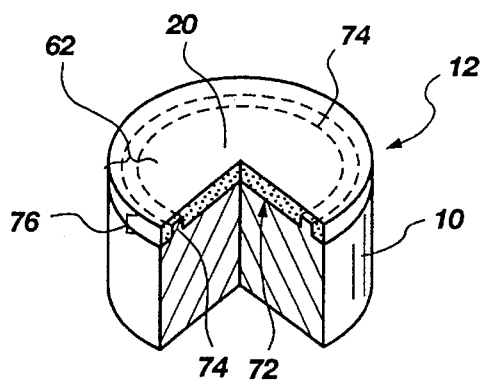
Fig. 12
Fig. 13
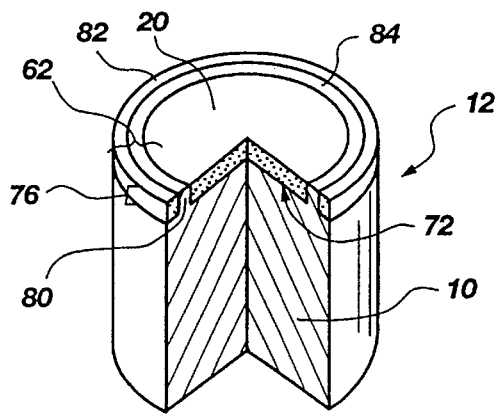
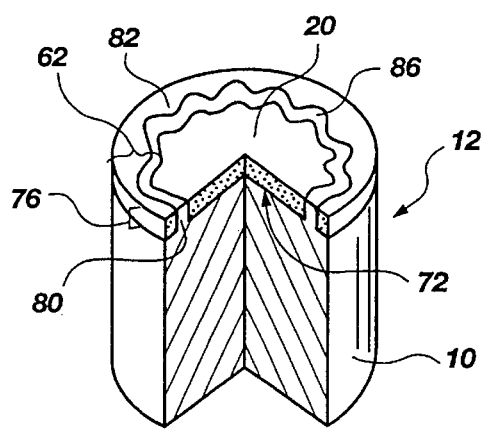
Fig. 14
Fig. 15
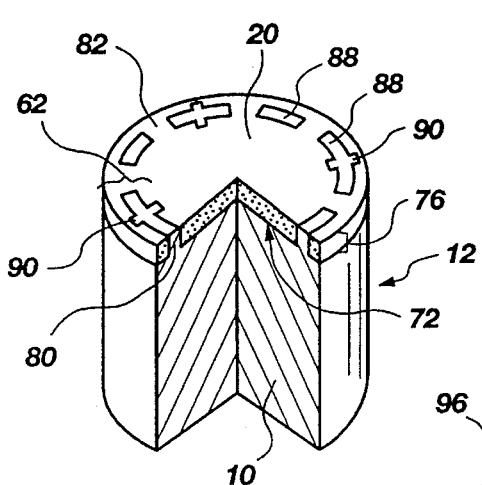
Fig. 16
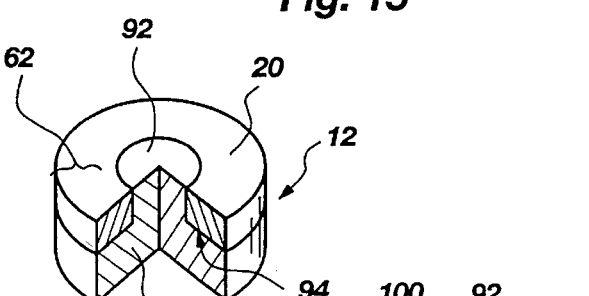
Fig. 17
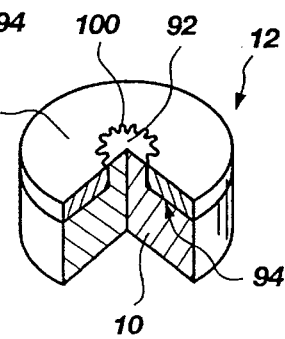
Fig. 19
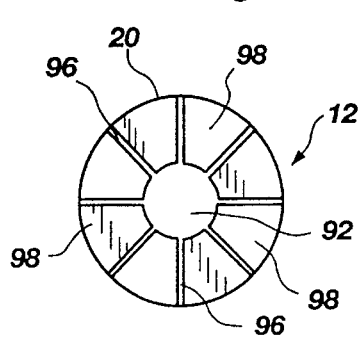
Fig. 18

STRESS-REDUCED SUPERHARD CUTTING ELEMENT

FIELD OF THE INVENTION

This invention relates to superhard cutting elements used in earth drilling stems, and more specifically relates to a cutting element having a superhard or superabrasive material layer and a support substrate, which are configured to redistribute and tailor the residual stress fields in the cutting element, the existence of which contributes to fracturing and degradation of the cutting element during drilling.

STATE OF THE ART

Cutting elements which comprise a superhard or superabrasive cutting material, such as polycrystalline diamond (PCD) or cubic boron nitride, formed to a hardened support, usually of carbide composition, are commonly used in various drill bit structures for cutting or shearing earth formations. A number of different configurations of cutting elements and materials, which may be adopted for use in forming cutting elements, has been disclosed in the patent literature.

Most commonly, cutting elements comprise a cemented tungsten carbide (WC) support, also referred to as a substrate or backing, usually in the form of a solid cylinder or disk having opposing planar surfaces, to which is applied on one of the planar surfaces a relatively thin layer or "table" of superhard, also termed superabrasive, material. When PCD is used as the abrasive material, the cutting element is typically formed by application of high temperature and high pressure (HTHP) which fuses, sinters or otherwise bonds layers of diamond crystals together and fuses them to the carbide substrate. Polycrystalline diamond compact (PDC) cutting elements made by HTHP techniques provide superior cutting characteristics as compared with conventional cutting elements, which do not employ superhard or superabrasive material.

However, it is well-known that in PDC cutting elements high residual stresses occur in both the abrasive layer as well as in the carbide substrate, the stresses developing as the cutting elements cool after HTHP formation because of the disparity in the coefficient of thermal expansion (COTE) and the bulk compressibility between WC and polycrystalline diamond. That is, WC has a higher coefficient of thermal expansion than polycrystalline diamond, and as the PDC is cooling after formation, the WC contracts more than the polycrystalline diamond. The difference in the bulk moduli of the substrate and superhard abrasive layer materials also contributes to such residual stresses. The resulting cutting element typically has a diamond table that is largely under compression and the carbide backing is in tension. The highest shear stresses are located at the carbide diamond interface. These stresses in conjunction with the high tensile stresses located in the abrasive layer and substrate make the cutter susceptible to fractures or cracks either as the PDC is being formed or later under drilling conditions, wherein high structural and thermal loads are imposed. This problem having been recognized, various solutions have been suggested for alleviating the tensile stresses which develop in PDC's.

For example, U.S. Pat. No. 5,217,081 to Waldenström discloses an insert for percussive and crushing-type drilling having a cemented carbide insert or substrate which has a cobalt-poor zone, a cobalt-rich zone and an eta-phase containing zone centrally located within the substrate, and one or more diamond or cBN layers or bodies are formed on the substrate by HTHP techniques. It is suggested in the Waldenström disclosure that the disclosed substrate is somehow modified in comparison to the prior art to obtain a COTE comparable to the abrasive material thereby reducing stress.

Further, U.S. Pat. No. 5,120,327 to Dennis discloses a carbide substrate having formed in one planar surface thereof parallel, spaced apart grooves into which diamond abrasive is formed when the diamond layer is applied to the substrate. The grooves are formed with a rounded bottom surface to avoid stress fractures forming in the side and base of the grooves. An annular ring portion of abrasive material surrounding the grooves of the substrate is also disclosed which purportedly provides radial reinforcement against the formation of fractures.

Others have disclosed varying configurations of the substrate or abrasive layer in an attempt to address cutting element problems other than reduction of tensile stresses in the WC backings. For example, U.S. Pat. No. 5,007,207 to Phaal discloses a cemented carbide support which has circular or spiral grooves formed in one planar surface thereof into which diamond or other abrasive compact material is formed when the abrasive layer is deposited on the cemented carbide support. The grooves in the substrate are formed specifically for the purpose of providing a wear edge which continues to expose abrasive material (i.e., diamond) to the formation although the edge of the abrasive layer is worn down to the substrate.

Modifications to the substrate and/or abrasive layer of cutting elements as disclosed in the art have made certain improvements in the functionality of cutting elements. However, tensile stresses still occur in the abrasive layer or substrate of such cutting elements, and stress fracturing may occur in the abrasive layer or substrate, or both, or along the interface therebetween. Ultimately, failure of the cutting element can result. Therefore, continuing improvements in cutting element configurations to reduce tensile stress in the cutter would be advantageous to the industry and the art.

Finite element analysis of state of the art PDC's performed by the inventors reveals that a significant amount of tensile stress occurs at the surface of the abrasive layer near the periphery, along the circumferential side surface in a region between the abrasive layer and substrate, and in the substrate. Thus, improvements in the cutting element structure to reduce, modify or reposition harmful stresses in those enumerated areas of the abrasive layer and the substrate would be advantageous to the art to reduce fractures.

SUMMARY OF THE INVENTION

In accordance with the present invention, a cutting element, comprised of an abrasive layer formed from a superhard or superabrasive material (referred to herein generally as "abrasives") and a suitable hard material substrate to which the superhard abrasive layer is attached, is configured so that tensile stresses occurring in the substrate are minimized and preferentially located, and compressive stresses in the abrasive layer are maximized. The cutting element of the invention is more particularly structured or configured to redistribute or reduce residual stresses which typically occur anywhere in the cutting element including: in the substrate, in the abrasive layer along the planar surface thereof (the cutting face), about the circumferential outer surface thereof, and at or near the interface between the abrasive layer and the substrate, particularly near the peripheral area of the abrasive layer. Fracture or cracking potential is reduced as a result, and the cutter is less subject to degradation during drilling.

Minimization of tensile stress in the substrate and the abrasive layer may be achieved through selectively structuring or configuring the substrate, or the abrasive layer, or both the substrate and the abrasive layer, to modify or shift the magnitude and location of tensile stresses to another part of the cutting element which is designed to support these stresses so that the cutting element is less susceptible to failure. Generally, selective structuring of the substrate of the present invention is made at or about the center of the substrate along a longitudinal axis therethrough. Selective structuring of the abrasive layer is generally made at or about the center of the abrasive layer, and may generally be made in a more peripheral zone thereof.

The most common construction of state of the art superhard cutting elements comprises a solid cylindrical substrate to which is formed a circular, disk-shaped superabrasive layer having a thickness or depth which is of lesser dimension than the thickness or depth dimension of the substrate. However, cutting elements may take different forms, including a half cylinder with a half moon-shaped abrasive layer or a tombstone-shaped substrate with a tombstone-shaped abrasive layer. Other geometrical shapes or configurations are possible. Thus, although for the sake of clarity, substrates are described herein as cylinders and abrasive layers are described as disks, it is understood that reference herein to the peripheral zone of the abrasive layer or the substrate, or reference to an ambient area or zone, refers to the outer perimeter of the structure, whether that structure is circular, tombstone-shaped, half moon-shaped, square or some other geometrical configuration.

In a first embodiment of the invention, the substrate body is fabricated by placing a solid core of suitably hard material, such as cemented WC, within a tube or ring formed of a metal or alloy, which is in turn positioned within an outer tube of carbide material, or other suitably hard material. As used herein, "hard material" refers to those materials which are suitably abrasion- or corrosion-resistant and which have a relatively lower COTE than the metal or alloys used in the adjacent or surrounding materials. The outer carbide tube, the inner metal tube and the centrally positioned core of carbide become fused together during the high temperature, high pressure process when the superabrasive layer is sintered and attached to the substrate. The metal or alloy used in the inner tube is selected to have a higher coefficient of thermal expansion and a higher modulus of toughness than the carbide material forming the inner core and the outer tube. Thus, the metal tube or ring places the surrounding outer carbide material tube and the inner carbide core in compression, concentrating tensile stresses in the tougher metal tube or ring, which is better able to support elevated tensile stresses than is the carbide material. The inner core, inner tube and outer tube may even be formed from materials each having a different COTE to enhance the redistribution of stresses.

The metal tube or ring of this embodiment may be equivalent in height to the inner carbide core and outer carbide tube so that the inner metal tube extends from one planar surface of the substrate body to the opposing planar surface of the substrate body. Alternatively, the metal tube or ring may be shorter in length than the outer carbide tube so that it extends from just beneath a first planar surface of the substrate body to just beneath the opposing second planar surface of the substrate body. In yet another embodiment, the metal tube may extend from one planar surface of the substrate and extend only partially into the substrate body. While the term "planar surface" is used herein to refer to those surfaces which are perpendicular to the longitudinal axis of the substrate, it is understood that those surfaces need not be strictly planar or flat. Rather, those surfaces, or one of the other, may be non-linear and may be wavy, convex, concave, etc.

In yet another alternative embodiment, the substrate may be fabricated with an inner core of metal material concentrically positioned within an annular carbide member. The inner core of metal material may extend from a first planar surface of the substrate to a second planar surface of the substrate. Alternatively, the inner core may extend from one planar surface to and beyond the opposing planar surface such that the inner core extends into the abrasive layer.

In another alternative embodiment, the substrate body may be structured with a metal or alloy disk embedded within the body of the substrate in an area which tends to experience the highest tensile stresses. The metal disk is concentrically positioned within the body of the substrate and is positioned parallel to a planar or substantially planar surface of the substrate body. The metal disk may be coplanar with one of the planar surfaces of the substrate or the metal disk may be positioned just beneath the planar surface. A single metal disk may be located at or below the planar surface to which the abrasive layer is attached, or, alternatively, a second metal disk may be located parallel to and at or below the second planar surface of the substrate body. The two metal disks are thus positioned in concentric orientation with the body of the substrate in parallel orientation to each other and longitudinally spaced apart. The metal disks are constructed from a tough metal having a high COTE and are positioned within the substrate in an area which, as identified through finite element analysis (FEA), displays the highest tensile stresses. The stresses which develop in the substrate are thus redistributed to and concentrated in the metal disks.

In yet another embodiment, the tensile stresses experienced in the substrate may be redistributed by forming the substrate from a portion of metal on which is formed a layer of carbide material or other suitably hard material. The portion of carbide material may be equivalent in thickness to the underlying metal portion or may be somewhat less thick. An abrasive layer is then formed on the surface of the carbide material. The residual tensile stresses are concentrated in the metal portion of the substrate body.

In the embodiments described heretofore, the metal or alloy of the inner tube or the disks may suitably be selected from that group of metals and alloys which have a high coefficient of thermal expansion, which display high toughness, and which preferably do not interfere with the HTHP sintering process. If the material is likely to interfere with the HTHP process, a thin layer of carbide material may be positioned between the metal material and the abrasive material to reduce or prevent such interference. Exemplar such metals include iron, steel, cobalt, nickel, tantalum, and various mixtures of iron-, cobalt- or nickel-based superalloys or tungsten carbide containing a high percentage of cobalt.

Tensile stresses, which typically occur at the surface of the abrasive layer and/or at the circumferential outer edge of the abrasive layer and underlying substrate, are further reduced by a modification in the abrasive layer in a peripheral zone near the perimeter of the abrasive layer. Thus, in another embodiment, tensile stresses in the abrasive layer may be redistributed by modifying the substrate to provide a peripheral ring of substrate material projecting upwardly from a planar surface of the substrate. The upwardly projecting ring of substrate material projects into the abrasive layer after the abrasive material is formed on that surface of the substrate. The distance the projecting ring of substrate material extends upwardly from the planar surface may be less than the thickness of the abrasive layer and the projecting ring is thereby embedded in the abrasive layer.

It has been observed by the inventors through finite element analyses that an attenuation of the abrasive layer thickness in a peripheral zone of the abrasive layer, as provided by the embodiment described immediately above, results in a transfer of tensile stresses to the substrate away from the outer perimeter of the cutter. That is, the stresses are redistributed from the abrasive layer to the outwardly projecting ring of substrate material and stress is reduced not only in the abrasive layer, but also in the substrate. Significant reduction in fracturing or cracking during drilling is expected.

The redistribution of tensile stresses away from the peripheral zone of the abrasive layer is also achieved by modifying the substrate in an area directly below the abrasive layer in an annular zone about the center of the substrate. Accordingly, in an alternative embodiment, the material of the substrate is modified in an ambient (i.e., annular) zone located at or near a planar surface of the substrate below where the peripheral portion of the abrasive layer is positioned.

The ambient zone of modified substrate comprises substrate material which is enhanced by the addition of materials with properties to facilitate redistribution of tensile stresses to the ambient zone. For example, in a tungsten carbide substrate, the ambient zone may comprise tungsten carbide which contains a higher cobalt content or a lower cobalt content, depending on the particular requirements of use. Increasing the cobalt content of the WC in the ambient zone increases the ductility and COTE of the material to aid in redistribution of tensile stresses, and a lower cobalt content in the WC facilitates reduction in the stresses initially formed near the peripheral area of the interface. The ambient zone of modified substrate is located about the center axis of the substrate and near those areas where tensile stresses occur. An abrasive layer is then attached to the planar surface by appropriate means such as HTHP sintering. The ambient zone of modified substrate positioned below the abrasive layer concentrates the high tensile stress therein and reduces fractures and cracks. The modified substrate may be fabricated by combining two or more pieces of material, such as carbide, having the aforementioned characteristics, and the pieces are fused together during the HTHP sintering process.

In yet another embodiment of the invention, the substrate is configured with a portion of substrate material which projects outwardly from a planar surface of the substrate on which the abrasive layer is attached. The projecting portion of substrate is positioned in an ambient area proximate the peripheral zone of the abrasive layer and projects from the planar or substantially planar surface of the substrate a distance equal to the thickness or depth of the abrasive layer which is attached to the planar surface such that the projecting portion of substrate extends through the abrasive layer to the outer surface thereof. The projecting portion of substrate acts as a flexural joint during the cooling phase of the sintering process and modifies the tensile stresses due to its presence. The projecting portion of substrate may be in any configuration which is suitable for acting as a flexural joint, including an annular ring having an equal radius about a central axis formed through the center of the substrate, a discontinuous annular ring or an annular ring having variable radius measurements about the arc thereof.

In still another embodiment of the invention, the substrate may be configured with a protruding portion which extends outwardly from a planar or substantially planar surface of the substrate in the location of the center axis of the substrate, and the protruding portion extends through the thickness of the abrasive layer. The protruding portion of the substrate provides a central core about which the abrasive layer is positioned. The abrasive layer may, therefore, be in the configuration of a ring which surrounds the central core of protruding substrate. Additionally, the protruding core of substrate material may have radiating portions of substrate material extending out from the protruding central core of substrate, similar to the spokes of a wheel. In such an embodiment, the abrasive layer may be segmented and positioned within the "spokes" of radiating substrate material. The core of substrate material provides a degree of compliance in the abrasive layer and the core reduces and redistributes the tensile stresses which occur in the substrate.

In yet another embodiment, the abrasive layer may be modified by constructing the abrasive layer with a layer of metal or metallized carbide sandwiched between two layers of abrasive material, such as polycrystalline diamond. Again, the metal layer concentrates the tensile stresses and reduces the probability of stress fractures or cracks.

The substrate of the cutting element of the present invention may be constructed of any suitable material which provides strength to the supporting element under operating conditions. Such materials typically include carbides, such as tungsten carbide, but may include other materials or mixtures of materials. The abrasive layer of the cutting element may also be fabricated from any suitable superhard or superabrasive material which is capable of cutting earth formations. Superabrasive materials often include polycrystalline diamond and cubic boron nitride, although other suitable materials may be used.

BRIEF DESCRIPTION OF THE DRAWINGS

In the drawings, which illustrate what is currently considered to be the best mode for carrying out the invention.

FIG. 12 is a cutaway view in perspective of a cutting element having an ambient portion of modified substrate;

FIG. 13 is a cutaway view in perspective of an alternative embodiment of a cutting element of the invention;

FIG. 14 is a cutaway view in perspective of an alternative embodiment of a modified substrate and abrasive layer;

FIG. 15 is a cutaway view in perspective of an alternative embodiment of a modified substrate;

FIG. 16 is a cutaway view in perspective of another alternative embodiment of a modified substrate;

FIG. 17 is a cutaway view in perspective of an alternative embodiment of the cutting element;

FIG. 18 is a plan view of a cutting element having a modified substrate and abrasive layer;

FIG. 19 is a cutaway view in perspective of an alternative embodiment of the substrate and abrasive layer;

DETAILED DESCRIPTION OF THE ILLUSTRATED EMBODIMENTS

Figure 25:
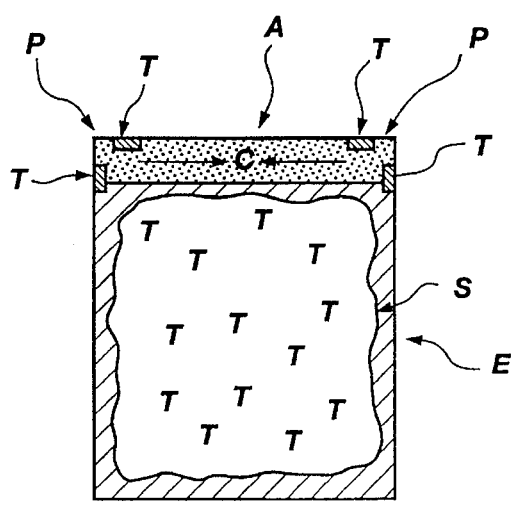
FIG. 25 is a schematic representation of the occurrence of tensile stresses which exist in a prior art cutting element construction.

FIG. 25 schematically illustrates the tensile stresses which occur in cutting elements of typical prior art construction. Thus, a cutting element E is depicted in cross section showing the abrasive layer A and the substrate support S. Tensile stresses T are illustrated as occurring throughout the substrate and in areas near the periphery P of the cutting element at the interface between abrasive layer A and substrate support S as well as at or near the surface of the abrasive layer A near the perimeter thereof. The cutting dement of the present invention is structured to reduce and/or redistribute the tensile stresses T located in the areas indicated.

In the drawings described hereinafter, the substrate of the cutting element is uniformly numbered 10, the cutting element is uniformly numbered 12 and the abrasive layer is uniformly numbered 20, regardless of differences in configuration and alternative embodiments. Abrasive layer 20 is comprised of a superhard or superabrasive material, generally a polycrystalline diamond formed by HTHP processing onto substrate 10. Such structures, when formed of polycrystalline diamond, are commonly referred to as PDC's, as previously noted.

Figure 1:
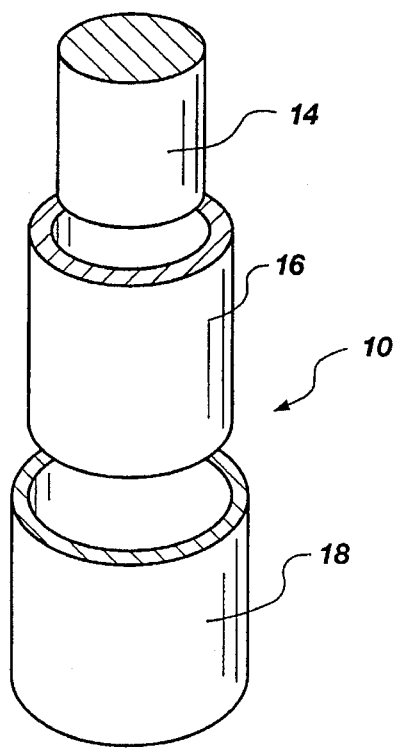
FIG. 1 is an exploded perspective view of a first embodiment of the invention illustrating a modified configuration of the substrate.

In a first embodiment of the present invention illustrated in FIG. 1, the substrate 10 portion of a cutting element 12 (shown in FIG. 2) comprises three separate parts. An inner core 14 of very hard material, such as tungsten carbide (WC), is positioned within an inner tube 16 of a metal or alloy or WC having a high percent of cobalt, which is in turn positioned within an outer tube 18 of hard material, such as WC. The material of the inner core 14 may be the same or different from the material of the outer tube 18. The inner tube 16 may be made from any suitably strong material which has a high coefficient of thermal expansion and toughness, and which, preferably, does not interfere with the high temperature, high pressure (HTHP) sintering process used to form the abrasive layer on the substrate. Such metal materials include iron, steel, cobalt, nickel, tungsten, tantalum, and a variety of iron-, nickel- or cobalt-based superalloys or mixtures thereof or WC containing a high percentage of cobalt.

Figure 2:
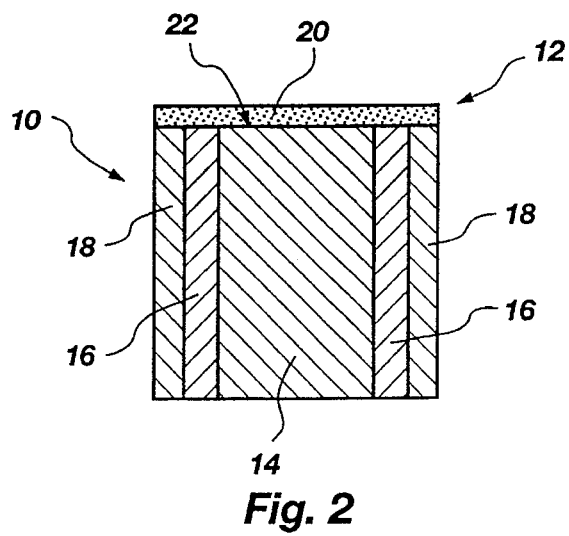
FIG. 2 is a view in cross section of the embodiment shown in FIG. 1 when assembled with an abrasive layer bonded thereto.

The substrate 10 may be fabricated by placing the inner core 14, inner metal tube 16 and outer tube 18 together as shown, placing the assembled substrate into an appropriate holder for application of high temperature and pressure, adding to the holder one or more layers of an abrasive material, such as synthetic diamond crystals in the form of a powder, and then subjecting the assembled substrate 10 and abrasive material to HTHP sintering. The inner core 14, inner metal tube 16 and outer tube 18 fuse together under the sintering process, and the abrasive layer 20 is formed from the diamond crystals and becomes integrally fused to a first or interfacial surface 22 of the substrate 10, as depicted in FIG. 2.

Figure 4:
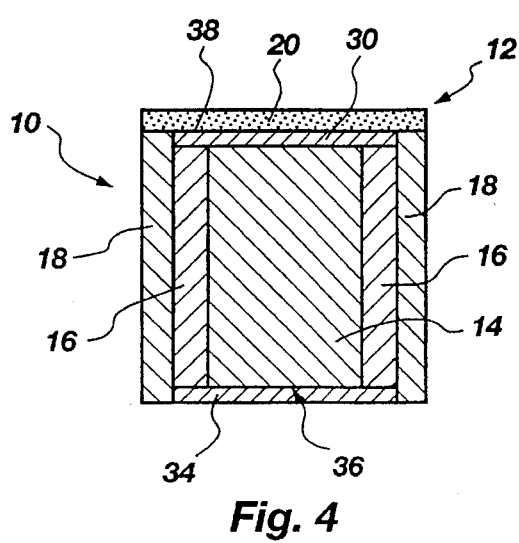
FIG. 4 is a view in cross section of the embodiment shown in FIG. 3 when assembled with an abrasive layer attached thereto.
Figure 3:
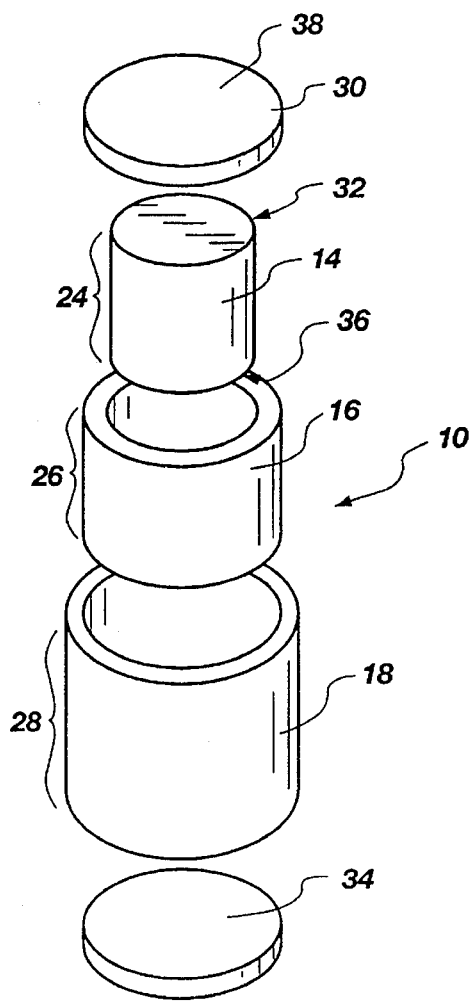
FIG. 3 is an exploded perspective view of an alternative embodiment of the invention illustrating a varied configuration of the substrate.

In a similar alternative embodiment, as illustrated in FIGS. 3 and 4, the substrate comprises an inner core 14 of a very hard material, such as WC, which is positioned within an inner tube of a metal, alloy or WC containing cobalt 16. The height 24 of the inner core 14 is substantially equivalent to the height 26 of the inner metal tube 16; however, the height 24 of the inner core 14 and height 26 of the inner metal tube 16 are less than the height 28 of the outer tube 18 into which the inner core 14 and inner metal tube 16 are positioned. A first tablet 30 of material is sized in diameter to be equivalent to the outer diameter of the inner metal tube 16 and is positioned over a first end 32 of the inner core 14, as seen in FIG. 4. Similarly, a second tablet 34 is sized in diameter to be equivalent to the outer diameter of the inner metal tube 16 and is positioned over a second end 36 of the inner core 14, as seen in FIG. 4. The assemblage of the substrate 10 is fused together, as described above, when subjected to HTHP sintering processes to form the abrasive layer 20 on a planar surface 38 of the substrate, shown in FIG. 4.

Figure 23:
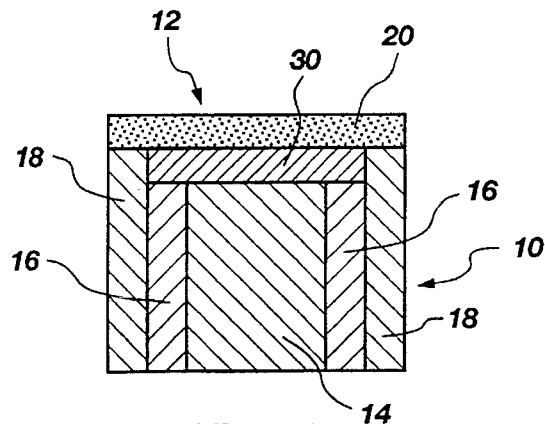
FIG. 23 is a view in cross section of an alternative embodiment illustrating a modified substrate.
Figure 26:
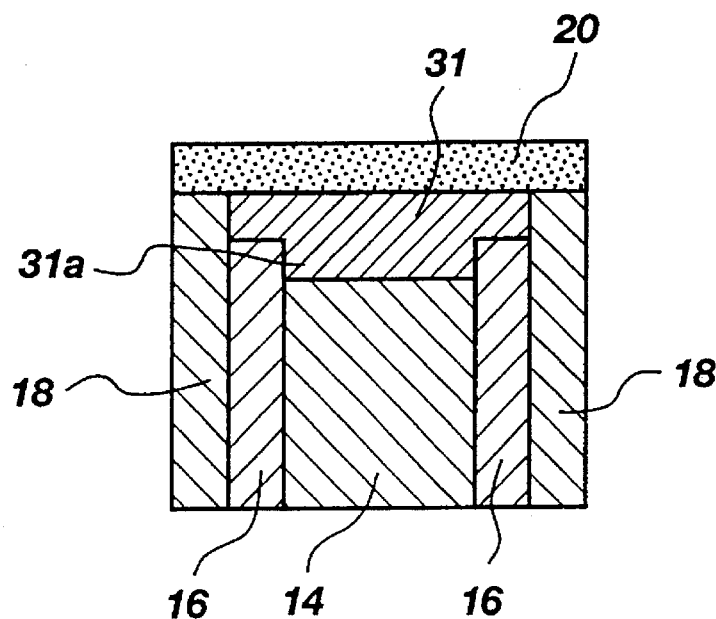
FIG. 26 is a view in cross section of an alternative embodiment of a modified substrate.
Figure 27:
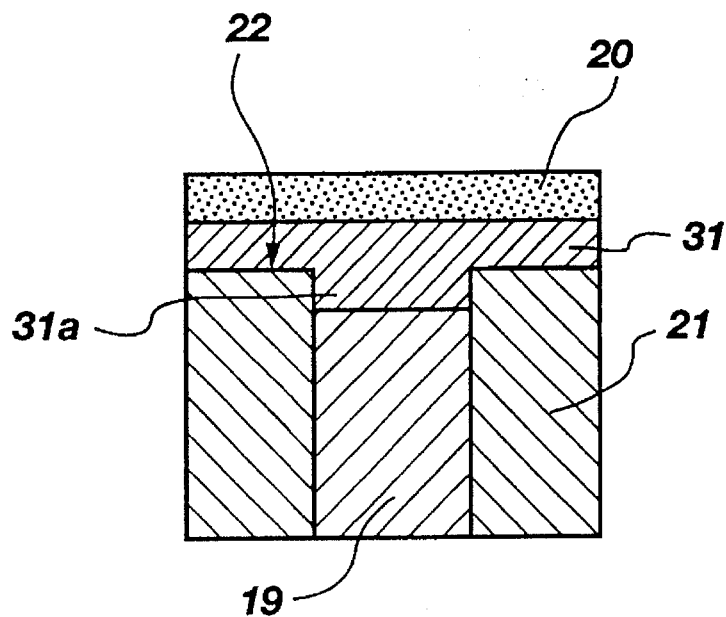
FIG. 27 is a view in cross section of yet another alternative embodiment of a modified substrate.

Alternatively, as shown in FIG. 23, the inner core 14 and inner tube 16 may be of equal height, but having less height than the outer tube 18, and a single tablet 30 of metal material may be positioned over the inner core 14 and inner tube 16 just below the abrasive layer 20. In still another alternative embodiment, as illustrated in FIG. 26, the inner core 14 may have less-height than the inner tube 16, which in turn has less height than the outer tube 18 and disk 31 is structured with an extending disk portion 31a to interface with the inner core 14. A similar cutter may be configured, as illustrated in FIG. 27, where an inner core 19 of less height than an annular member 21 has a disk 31 positioned over the interfacial surface 22 which extends to interface with the inner core 19.

Figure 21:
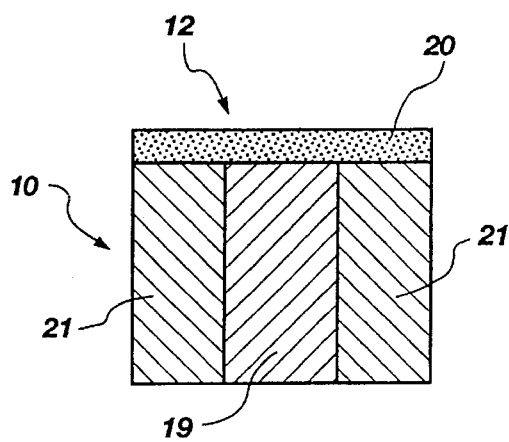
FIG. 21 is a view in cross section of an alternative embodiment having a central core.
Figure 22:
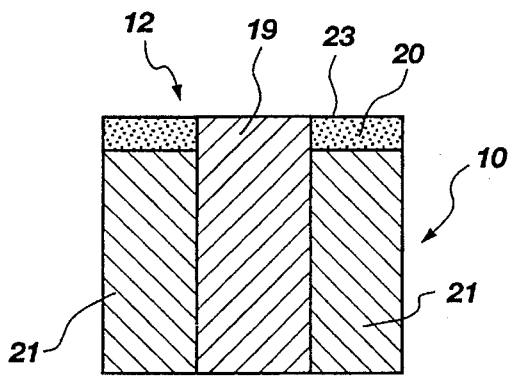
FIG. 22 is a view in cross section of an alternative embodiment illustrating a central core.

In yet another alternative embodiment, an inner core 19 of metal material may be concentrically located within an annular member 21 and the inner core 19 is equivalent in height to the annular member 21, as illustrated in FIG. 21. An abrasive layer 20 is formed to the substrate 10. Alternatively, as shown in FIG. 22, the inner core 19 may be greater in height than the annular member 21 such that the inner core 19 extends into the abrasive layer 20. As shown, the inner core 19 may extend fully through the abrasive layer 20 so that the inner core 19 may be viewed from the top surface 23 of the abrasive layer 20, or the inner core 19 may extend to just below the top surface 23 of the abrasive layer 20.

Figure 5:
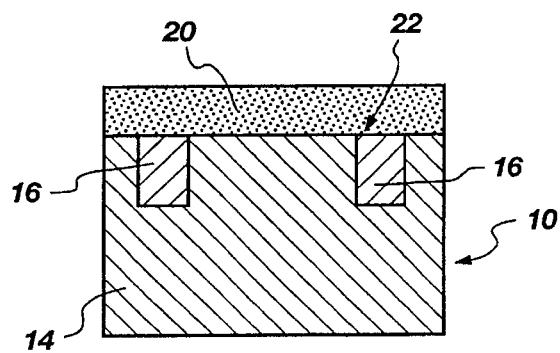
FIG. 5 is a view in cross section of an alternative embodiment having a modified substrate.
Figure 6:
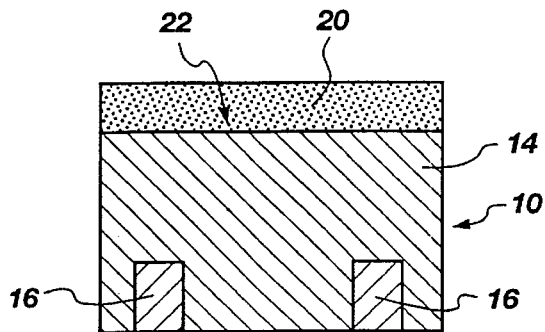
FIG. 6 is a view in cross section of another alternative embodiment having a modified substrate.

In another alternative embodiment illustrated in FIG. 5, the inner tube of metal or alloy 16 is located at an interfacial surface 22 of the substrate 10 and extends into the substrate body 10 below the abrasive layer 20. The inner metal ring 16 may be fitted into an annular groove milled into the substrate 10, or a recess (similar to that shown in FIG. 7 at 42) may be formed in the substrate 10 into which the inner metal ring 16 is positionable, and a carbide disk (similar to that shown in FIG. 7 at 54) may be positioned in the recess within the inner metal ring 16 so that the carbide disk is coplanar with the first planar surface of the substrate body 10. In another similar embodiment, illustrated in FIG. 6, the inner metal ring 16 may be positioned at the second planar surface 39 of the substrate 10 and may extend toward the interfacial surface 22 a select distance.

The embodiments illustrated in FIGS. 1–6 depict a modified substrate configuration, where the modification is at or about a central axis of the substrate 10 along its longitudinal axis and perpendicular to an interfacial surface 22 of the substrate 10. The volume of hard (WC) material encircled within the modification is placed in compression, or in a state of reduced tension, due to the greater thermally-induced expansion of the material of the metal ring or tube 16. The modified substrate allows tensile stresses produced in the substrate 10 to be concentrated in the inner metal tube 16 or ring which is constructed of a material better suited for absorbing the stresses than is the carbide material typically used for the inner core 14 or outer tube 18, or both.

Figure 7:
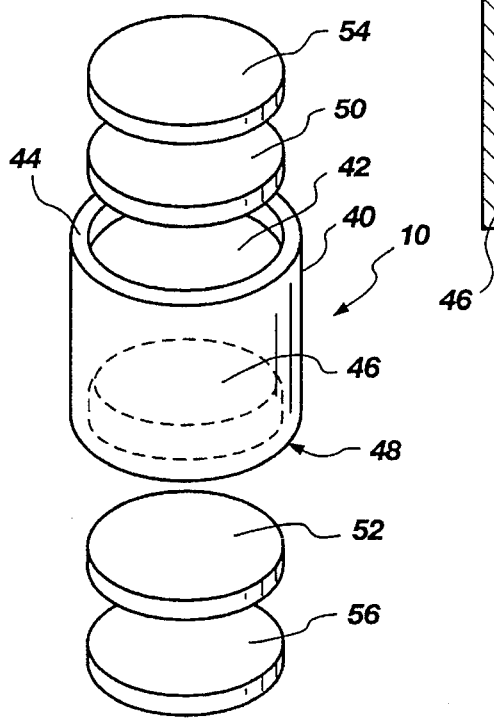
FIG. 7 is an exploded view of an alternative embodiment of the substrate.

Alternative embodiments which provide a modified substrate for redistributing tensile stresses are illustrated in FIGS. 7–11. As shown in FIG. 7, the substrate 10 comprises a body 40, here shown as being cylindrical in lateral cross section, having at least one depression or cavity 42 formed in one end 44 of the cylindrical body 40. However, as illustrated, a second depression or cavity 46 may be formed in the opposing end 48 of the cylindrical body 40. The cylindrical body 40 of the substrate 10 is formed from a suitable hard material such as WC. A disk 50 of a tough metal is sized to be receivable within the depression 42 of the cylindrical body 40. And as illustrated in FIG. 7, a second such disk 52 of tough metal, sized to be receivable within a second depression 46 of the cylindrical body 40, is positioned therein. The metal used to fabricate the metal disks 50 and 52 is any suitable material which has a high coefficient of thermal expansion, high toughness and which is suitable for use in HTHP sintering. Such metal materials may include iron, steel, tungsten, nickel, cobalt, tantalum and iron-, nickel- or cobalt-based superalloys, or combinations thereof, and WC having a high percentage of added cobalt.

Figure 8:
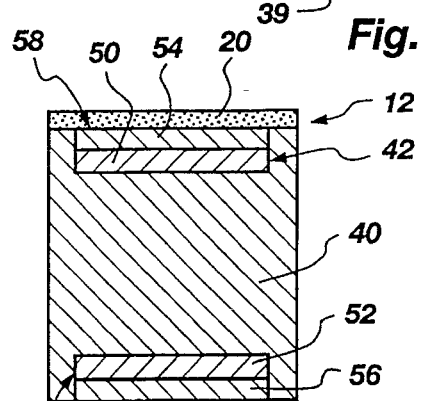
FIG. 8 is a view in cross section of the substrate shown in FIG. 7 when assembled and with an abrasive layer bonded thereto.
Figure 9:
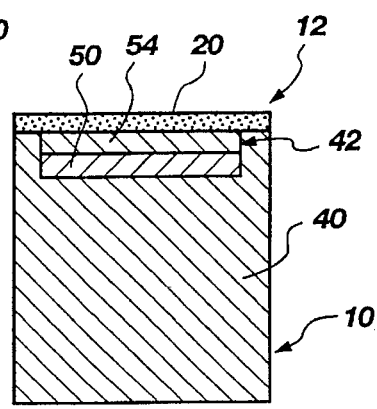
FIG. 9 is a view in cross section of an alternative embodiment of the substrate illustrated in FIGS. 7 and 8.
Figure 10:
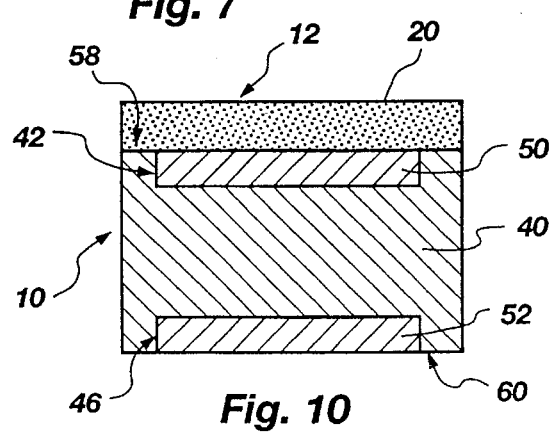
FIG. 10 is a view in cross section of an alternative embodiment having a modified substrate.

A substrate disk 54, made of substrate material similar to the cylindrical body 40, is sized to be received within the depression 42 and to cover the metal disk 50 positioned within the depression 42. Similarly, a substrate disk 56 is sized to be received within the second depression 46 and to cover the metal disk 52 therewithin. As can be seen in FIG. 8, the depressions 42, 46 are sized in depth to receive both a metal disk 50, 52, and a substrate disk 54, 56, and opposing planar or substantially planar surfaces 58, 60 result from the assemblage. The substrate disks 54, 56 and metal disks 50, 52 are fused to the cylindrical body 40 during the HTHP sintering process which forms and attaches the abrasive layer 20 to one of the planar surfaces, here shown as interfacial surface 58, to produce an integral body.

In an alternative embodiment illustrated in FIG. 9, the body 40, again shown as a cylinder, may be formed with a single depression 42 into which is received a single metal disk 50 and a single substrate disk 54 thereover. The cylindrical body 40, metal disk 50 and substrate disk 54 are integrally fused together during the HTHP sintering process which forms and attaches the abrasive layer 20 to the substrate 10. In yet another embodiment illustrated in FIG. 10, a metal disk 50 is sized to be received in the depression 42 formed in an interfacial surface 58 of the substrate 10, and the metal disk 50 is coplanar with the interfacial surface 58 of the substrate 10. A second metal disk 52 may be similarly sized to be receivable within a second recess 46 formed in the second planar surface 60 of the substrate 10, and the second metal disk 52 is coplanar with the second planar surface 60 of the substrate 10.

In the embodiments shown in FIGS. 7–10, the metal disk 50 positioned proximate the abrasive layer 20 concentrates residual tensile stresses therein. However, in the embodiment illustrated in FIGS. 8 and 10, the second metal disk 52 may further provide symmetry to the substrate 10 which would eliminate substrate orientation errors during the HTHP sintering process.

Figure 11:
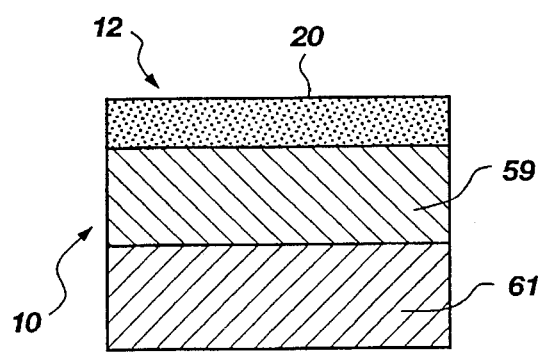
FIG. 11 is a view in cross section of another alternative embodiment having a modified substrate.

Another embodiment of the invention which modifies the substrate 10 to redistribute tensile stresses is illustrated in FIG. 11 where the substrate 10 is formed from a layer of hard material 59, such as WC, positioned adjacent a layer of metal 61. The WC layer 59 and the metal layer 61 may be approximately equal in depth dimension, or the metal layer 61 may be slightly greater in depth dimension, as shown in FIG. 11. Again, the metal layer 61 concentrates tensile stresses therein. An abrasive layer 20 is formed to the WC layer 59.

In yet another embodiment, illustrated in FIG. 12, the substrate 10 may be modified to reduce or redistribute tensile stress which occurs near the interface between the abrasive layer 20 and the substrate 10 by varying the material of the substrate in an area proximate the peripheral zone 62 of the abrasive layer 20. Thus, a ring 66 of modified substrate material is positioned along an interfacial surface 68 of the substrate 10 to which the abrasive layer 20 will be attached, and is located proximate the peripheral zone 62 of the abrasive layer 20. The modified substrate material of the ring 66 acts to concentrate tensile stresses therein and away from the peripheral zone 62 of the abrasive layer 20. Such modified substrate material may include high cobalt content carbide which provides a degree of ductility to the ring 66 of material so that tensile stresses are redistributed to the ring 66, or may include low cobalt content carbide which reduces tensile stresses initially formed at the interface. The substrate 10 of the embodiment shown in FIG. 12 is fabricated by assembling together the ring 66 portion of modified substrate material with a cylinder 70 of substrate material, and subjecting the assemblage to HTHP sintering.

In another alternative embodiment shown in FIG. 13, the substrate 10 may be structurally modified in a peripheral, or ambient, area proximate the peripheral zone 62 of the abrasive layer 20 by configuring the interfacial surface 72 of the substrate 10 with a ring 74 of substrate material which projects outwardly from the interfacial surface 72 of the substrate 10 a select distance. Thus, when the abrasive layer 20 is formed to the interfacial surface 72 by HTHP sintering techniques, the ring 74 of substrate material extends into the abrasive layer 20, but not to the full thickness 76 of the abrasive layer 20. In prior art cutting elements, an annular region near the periphery of the diamond (abrasive) layer is under high residual tension and thus prone to fracture. The previously-described structure provides a means for redistributing this specific stress field. The thinner ring of abrasive material above ring 74 is believed to act as a type of structural stress diffuser for the diamond.

In other alternative embodiments, as shown in FIGS. 14–16, the substrate 10 may be modified in an area proximate the peripheral zone 62 of the abrasive layer 20 by providing a projecting portion 80 of substrate material which extends outwardly from the interfacial surface 72 of the substrate 10 a distance equivalent to the thickness 76 of the abrasive layer 20. Therefore, the projecting portion 80 of substrate material is positioned in an ambient zone about the interfacial surface 72 and is visible from the upper surface 82 of the abrasive layer 20.

Finite element analyses demonstrate that fractures may occur in the abrasive layer 20 and in the substrate 10 due to residual tensile stresses caused by the disparity between the COTE of the substrate material (usually WC) and the COTE of the abrasive layer (usually polycrystalline diamond), in addition to a disparity in the bulk moduli of the two materials. It can be demonstrated that a disruption or attenuation of the abrasive layer 20, or diamond table, as illustrated in FIGS. 14–16, can reduce the occurrence of fracturing in the diamond table since the projecting portion 80 of substrate material acts as a flexural joint during the cooling and depressurization phase of the HTHP sintering process.

The projecting portion 80 of substrate material may be in the configuration of a ring 84, as shown in FIG. 14, or the projecting portion 80 may be in some other configuration. For example, as shown in FIG. 15, the projecting portion 80 may be in a substantially circular configuration, but may be undulated along the edges thereof. Alternatively, the projecting portion 80, as shown in FIG. 16, may be discontinuous and may comprise separated segments between which abrasive material resides. The individual segments 88 of the projecting portion 80 may further be configured differently, such as by additional lateral portions 90 which enhance flexure in more than one plane. Although the projecting portion 80 is illustrated in FIGS. 14–16 as extending to the upper surface 82 of the abrasive layer 20, the projecting portion 80 may actually extend up to a select distance below the upper surface 82.

In other embodiments of the invention illustrated in FIGS. 17–19, the substrate 10 and the abrasive layer 20 may be mutually configured to redistribute the stresses which typically occur in the abrasive layer 20 and substrate 10. Thus, as illustrated in FIG. 17, the substrate 10 of the cutting element 12 is configured with a center core 92 of substrate material which projects beyond the interfacial surface 94 to which the abrasive layer 20 is attached. Although the interfacial surface 94 is illustrated here as being flat or planar, the interfacial surface 94 may actually be non-linear or other than planar. In the HTHP sintering process, the abrasive layer 20 is formed on the substrate 10 and around the center core 92 so that a ring of abrasive material results. The center core 92 of substrate material provides a degree of compliance in the abrasive layer 20 to maximize the compressive forces in the abrasive layer and to redistribute tensile stresses in the substrate 10. The center core 92 of substrate also reduces and redistributes the tensile stresses which occur in the substrate 10.

The center core 92 of the substrate 10 may be modified further, as shown in FIG. 18, to include walls 96 of substrate material radiating outwardly from a central axis of the center core 92 and segments 98 of abrasive material are formed between the walls 96 of substrate material accordingly. Further, the center core 92 of the substrate 10 may be in a configuration other than a strictly arcuate one as shown in FIG. 17. Rather, as shown in FIG. 19, the center core 92 may have an undulated edge 100.

Figure 20:
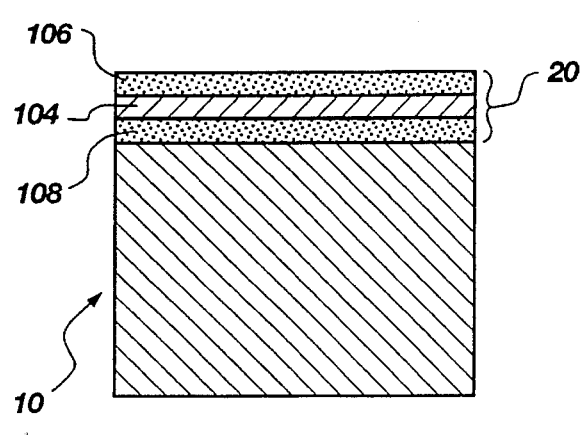
FIG. 20 is a view in cross section of an alternative embodiment having an abrasive layer of stratified material layers.
Figure 24:
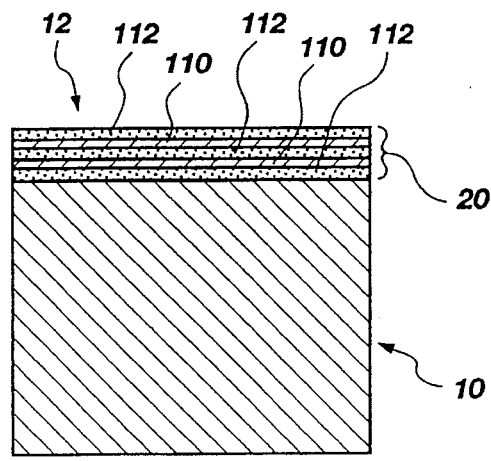
FIG. 24 is a view in cross section of an alternative embodiment illustrating a modified abrasive layer.

In another embodiment of the invention, as illustrated in FIG. 20, the abrasive layer 20 may be modified to redistribute tensile stresses which may normally occur in the abrasive layer 20 by configuring the abrasive layer 20 with a thin layer of metal 104 sandwiched between a top layer 106 of superhard abrasive material and a bottom layer 108 of superhard abrasive material. The tensile stresses which form in the abrasive layer 20 as described are concentrated in the metal layer 104. Alternatively, as illustrated in FIG. 24, the abrasive layer 20 may comprise multiple thin layers of metal or other suitable material 110 alternately layered between thin layers of diamond 112. Again, the layers 110 of metal or other suitable material provide a means for reducing or redistributing tensile stress in the abrasive layer. In addition, this configuration may provide compliance for the abrasive layer to yield before fracturing and in essence make the abrasive layer tougher and more resistant to fracture.

The cutting element of the present invention is structured with a modified substrate or abrasive layer, or both, to reduce or redistribute stresses which typically occur in the abrasive layer and the substrate, particularly in those areas where tensile stresses are often high, such as near the peripheral zone of the abrasive layer, on the surface of the abrasive layer, in the substrate, and at the abrasive layer/substrate interface. The embodiments described and illustrated herein are exemplar configurations which may be adopted to reduce or redistribute stresses as noted. However, other embodiments which similarly reduce or redistribute detrimental stresses, as revealed by finite element analyses or other analytical means, will dictate other relevant embodiments as determinable by those skilled in the art. Hence, reference herein to specific details of the illustrated embodiments is by way of example and not by way of limitation. It will be apparent to those skilled in the art that many additions, deletions and modifications to the illustrated embodiments of the invention may be made without departing from the spirit and scope of the invention as defined by the following claims.

What is claimed is:

1. A cutting element for use in an earth drilling bit comprising: an abrasive layer of superhard material structured with a first surface for contacting
   an earth formation, having a selected thickness, and having a peripheral zone
   about said first surface; and a substrate body providing support for said abrasive layer, said substrate body having
   a central axis, an interfacial surface to which is attached said abrasive layer and a circumferential profile, said substrate body having a modified portion positioned at or about said central axis and oriented perpendicular to said first surface.

2. The cutting element of claim 1, wherein said superhard material of said abrasive layer is polycrystalline diamond.

3. The cutting element of claim 1, wherein said modified portion of said substrate body includes an inner core of hard material positioned within an inner tube of metal material which is positioned within an outer tube of hard material, said metal of said inner tube being selected to have a higher coefficient of thermal expansion and higher modulus of toughness than said hard material of said inner core or the hard material of said outer tube.

4. The cutting element of claim 3, wherein said inner core, said inner metal tube and said outer tube have equivalent dimensions of height.

5. The cutting element of claim 4, wherein said substrate body is circular in lateral cross section, wherein said inner core is circular in lateral cross section, and wherein said inner metal tube and said outer tube are cylindrical in lateral cross section.

6. The cutting element of claim 3, wherein said inner core and said inner metal tube have an equivalent dimension of height, said dimension of height being less than a dimension of height of said outer tube, and said substrate body further comprising a first disk of hard material positioned within said outer tube and over said inner metal tube and inner core to provide said interfacial surface of said substrate body.

7. The cutting element of claim 6, wherein said substrate body includes a substantially planar surface spaced apart from and parallel to said interfacial surface and further comprises a second disk positioned within said outer tube and over said inner metal robe and inner core spaced apart from and parallel to said first disk to provide said substantially planar surface of said substrate body.

8. The cutting element of claim 3, wherein said inner core, said inner tube and said outer tube are non-equivalent in dimension of height and further comprising a disk configured in size and dimension to be positionable over said inner tube, within said outer tube, over said inner core and within said inner tube.

9. The cutting element of claim 1, wherein said substrate body comprises an inner core concentrically positioned within an annular member of hard material, said inner core being selected to have a higher coefficient of thermal expansion and higher modulus of toughness than the material of said annular member.

10. The cutting element of claim 8, wherein said inner core and said annular member have substantially equivalent height dimensions.

11. The cutting element of claim 8, wherein said inner core has a height dimension greater than a height dimension of said annular member and said inner core extends beyond said interfacial surface.

12. The cutting element of claim 1, wherein said modified portion of said substrate body comprises a tube of metal material positioned to extend from said interfacial surface into said substrate body for a distance less than the height of said substrate body.

13. The cutting element of claim 1, wherein said substrate body includes a substantially planar surface spaced apart from and parallel to said interfacial surface and said modified portion of said substrate body comprises a tube of metal material positioned to extend from said substantially planar surface into said substrate body for a distance less than the height of said substrate body.

14. The cutting element of claim 1, wherein said modified portion of said substrate body comprises a ring of substrate material positioned below said abrasive layer coplanar with said interfacial surface, said ring of substrate material containing hard material altered with other material suitable for concentrating tensile stress therein.

15. The cutting element of claim 1, wherein said substrate body comprises a solid inner core of hard material positioned within an annular member, wherein said solid inner core has a height dimension less than said annular member, and wherein said substrate body further comprises a disk configured to be positionable over said annular member and extending into said annular member to cover said solid inner core, said disk forming said interfacial surface.

16. A cutting dement for use in an earth drilling bit comprising:
    an abrasive layer of superhard material structured with a first surface for contacting an earth formation, having a selected thickness, and having a peripheral zone about said first surface; and
    a substrate body providing support for said abrasive layer, said substrate body having an interfacial surface to which is attached said abrasive layer, a substantially planar surface spaced apart from and parallel to said interfacial surface and a circumferential profile, said substrate body having a modified portion including at least one depression formed in one end of said substrate body parallel to said interfacial surface and at least one metal disk sized to be received within said at least one depression concentric to said substrate body.

17. The cutting element of claim 16, wherein said substrate body is formed of a suitably hard material and further including a second disk formed of said hard material comparably sized to said at least one metal disk and also being receivable within said at least one depression of said substrate body over said at least one metal disk, said second disk forming in part said interfacial surface of said substrate body.

18. The cutting element of claim 17, wherein said substrate body further comprises a second depression formed in a second end opposing said one end of said substrate body, said second depression being sized to receive a second metal disk and a third disk of hard material therein to form in part said substantially planar surface.

19. The cutting element of claim 16, wherein said substrate body is circular in lateral cross section.

20. The cutting element of claim 16, wherein said at least one metal disk sized to be received within said at least one depression is coplanar with said interfacial surface.

21. The cutting element of claim 20, wherein said substrate body has a second depression formed in said substantially planar surface and a second metal disk sized to be receivable into said second depression, said second metal disk being positioned in said second depression to be coplanar with said substantially planar surface.

22. A cutting element for use in an earth drilling bit comprising:
    an abrasive layer of superhard material structured with a first surface for contacting an earth formation and having a selected thickness, a peripheral zone about said first surface, and a modified portion positioned proximate said peripheral zone and distanced apart from the center of said abrasive layer; and
    a substrate body providing support for said abrasive layer, said substrate body having an interfacial surface to which is attached said abrasive layer, an opposing substantially planar surface, a circumferential profile and a projecting portion of substrate material which extends outwardly from said interfacial surface into said abrasive layer formed on said interfacial surface, said projecting portion of said substrate material forming said modified portion of said abrasive layer.

23. The cutting element of claim 22, wherein said projecting portion of said substrate material extends outwardly from said interfacial surface a distance less than said thickness of said abrasive layer.

24. The cutting element of claim 23, wherein said projecting portion of said substrate comprises a ring of substrate material.

25. The cutting element of claim 22, wherein said projecting portion of said substrate material extends outwardly from said interfacial surface a distance substantially equivalent to said thickness of said abrasive layer.

26. The cutting element of claim 25, wherein said projecting portion of said substrate material comprises a circular ring.

27. The cutting element of claim 25, wherein said projecting portion of said substrate material comprises a ring having an uneven, undulated edge.

28. The cutting element of claim 25, wherein said projecting portion of said substrate material is discontinuous about said peripheral zone of said abrasive layer.

29. A cutting element for use in an earth drilling bit comprising:

an abrasive layer of superhard material structured with a first surface for contacting an earth formation, having a selected thickness, a periphery, and a central axis, said abrasive layer having a modified portion positioned about said central axis; and a substrate providing support for said abrasive layer, said substrate having an interfacial surface to which is attached said abrasive layer, a circumferential profile, and a central longitudinal axis, said interfacial surface of said substrate being modified about said central longitudinal axis to provide a solid core of substrate material surrounded by said superhard material, said abrasive layer extending from proximate said central longitudinal axis to said circumferential profile and being coextensive with said interfacial surface.

30. The cutting element of claim 29, wherein said solid core of substrate material is configured with an arcuate outer edge oriented toward said abrasive layer.

31. The cutting element of claim 29, wherein said solid core of substrate material is configured with an uneven, undulated edge oriented toward said abrasive layer.

32. The cutting element of claim 29, wherein said abrasive layer is discontinuous in an area formed between said central axis and said periphery.

33. The cutting element of claim 32, wherein said solid core of substrate material is configured with outwardly radiating walls of substrate material which extend from said solid core to said circumferential profile of said substrate, said abrasive layer being formed between said outwardly radiating walls of substrate material.

34. A cutting element for use in an earth drilling bit comprising:

a substrate for supporting an abrasive superhard material thereon, said substrate having an interfacial surface to which a layer of said abrasive superhard material is formable, a substantially planar surface spaced apart from and parallel to said interfacial surface, a circumferential profile extending between said interfacial and substantially planar surfaces, and an annular zone positioned proximate said interfacial surface which is structured to redistribute residual tensile stresses occurring proximate an interface between said layer of abrasive superhard material and said interfacial surface of said substrate; and an abrasive layer formed to said substrate on said interfacial surface.

35. The cutting element of claim 34, wherein said substrate in formed of tungsten carbide.

36. The cutting element of claim 35, wherein said abrasive superhard material is polycrystalline diamond.

37. A cutting element for use in an earth drilling bit comprising:

an abrasive layer of superhard material structured with a first surface for contacting an earth formation, having a selected thickness, and having a peripheral zone about said first surface; and a substrate body providing support for said abrasive layer, said substrate body having an interfacial surface to which is attached said abrasive layer, a substantially planar surface spaced apart from and parallel to said interfacial surface and a modified portion positioned in parallel orientation to said interfacial surface, said substrate body further comprising a thickness of metal material positioned adjacent a thickness of hard material, said abrasive layer being attached adjacent said thickness of hard material.

38. A cutting element for use in an earth drilling bit comprising:

an abrasive layer of superhard material structured with a first surface for contacting an earth formation and having a selected thickness, a peripheral zone about said first surface, and a modified portion positioned proximate said peripheral zone, said abrasive layer comprising a layer of metal material sandwiched between two layers of said superhard material, said metal material being positioned to concentrate residual tensile stresses therein; and a substrate body providing support for said abrasive layer, said substrate body having an interfacial surface to which is attached said abrasive layer, an opposing substantially planar surface and a circumferential profile.

39. The cutting element of claim 38, wherein said abrasive layer comprises a plurality of alternating layers of superhard material and other suitably hard material.

* * * * *

UNITED STATES PATENT AND TRADEMARK OFFICE
CERTIFICATE OF CORRECTION

PATENT NO. : 5,492,188
DATED : February 20, 1996
INVENTOR(S) : Smith et al.

It is certified that error appears in the above-indentified patent and that said Letters Patent is hereby corrected as shown below:

On the title page, under "U.S Patent Documents," change "5,103,948" to --5,193,948--;

In col. 1, lines 16, 19, and 20, change "cuffing" to --cutting--;

In col. 6, line 3, change "are" to --arc--;

In col. 7, line 58, change "dement" to --element--;

In col. 11, line 58, change "cuffing" to --cutting--;

In col. 14, line 11, change "dement" to --element--;

Signed and Sealed this

Twenty-fourth Day of December, 1996

Attest:

BRUCE LEHMAN

*Attesting Officer*  *Commissioner of Patents and Trademarks*